March 26, 1929. P. G. BERRY 1,706,434
MOUSE EXCLUDING DEVICE FOR THE PEDAL OPENINGS OF PIANOS
Filed Dec. 6, 1924
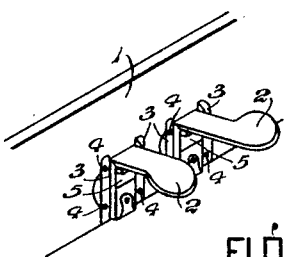
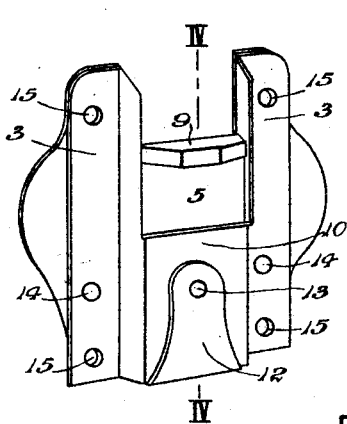
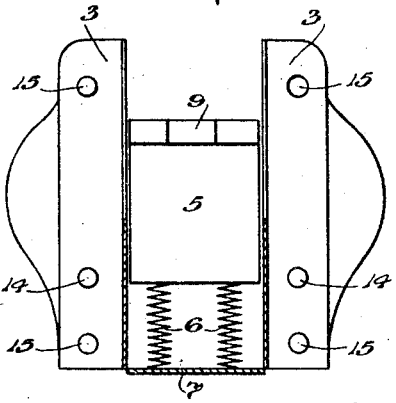
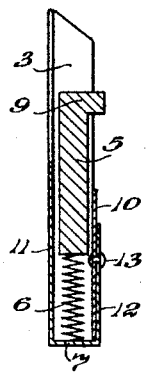
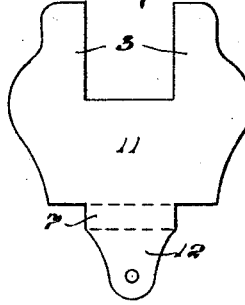
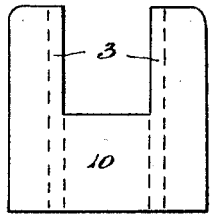
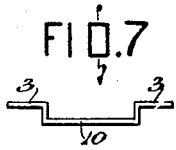
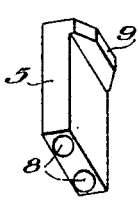
INVENTOR:
Percy George Berry
BY: Francis E. Boyce
ATTORNEY.

Patented Mar. 26, 1929.

1,706,434

UNITED STATES PATENT OFFICE.

PERCY GEORGE BERRY, OF SOUTH CANTERBURY, NEW ZEALAND.

MOUSE-EXCLUDING DEVICE FOR THE PEDAL OPENINGS OF PIANOS.

Application filed December 6, 1924, Serial No. 754,306, and in New Zealand March 14, 1924.

This invention relates to means for preventing mice from entering pianos through the pedal openings of such pianos, the object of the invention being to provide a novel device for attachment as by screws or the like, to the portion of the case of the piano at which such openings occur, such device being adapted to permit of the movement of the pedal when depressed and to automatically close the said opening when the pedal resumes its normal upper position.

In order that the nature of the invention and its construction may be clearly understood, it will now be fully described and explained with reference to the accompanying sheet of drawings, in which:—

Fig. 1.—is a perspective view of a portion of the case of a piano showing the pedals with the invention applied thereto, Fig. 2.—is a perspective view of the attachment, Fig. 3.—is a front elevation of the same with the forward portion of the enclosing casing cut away to clearly reveal the internal arrangements, Fig. 4.—is a cross section through the line IV—IV, Fig. 2, Fig. 5.—shows, in flat form, the rear composing plate of the case or frame of the attachment, Fig. 6.—shows, in similar form, the front plate of such frame or case, Fig. 7.—is a plan-view of the said front plate when bent to the required shape, and, Fig. 8.—is a perspective view of the slide carried in the said frame.

As here shown 1 is the case of the piano and 2 are the pedals projecting outwardly through openings in such case.

In carrying out the invention there are provided a pair of vertically disposed guide members 3 adapted for attachment as by means of screws or the like 4, to the portions of the case on each side of the pedal openings.

Arranged beneath the pedal 2 and slidably mounted between the said guides 3 is a member or slide 5, which is maintained upward with its upper edge in contact with the underside of the pedal by means of springs 6 which give to permit of the slide moving downward under pressure of the pedal when the latter is depressed.

In the preferred form of the construction the said springs 6 are of helical form and are arranged in compression between an underlying stationary portion 7 of the structure and the lower edge of the slide 5, which latter is preferably formed with holes 8 to receive the upper ends of such springs.

The upper end of the slide 5 is preferably turned over outward or otherwise formed with a suitable lug 9 to receive the pedal and to strengthen such slide.

The space between the lower edge of the slide, when in its upper position, and the lower termination of the pedal opening, is enclosed by means of a plate or shield 10 arranged parallel with and to the outer side of the said slide, such shield being preferably attached to or formed integral with the said guide members and a second plate or shield 11 is also preferably provided to similarly connect the guides at the corresponding position to the rear side of the slide, thus constituting a pocket within which the lower portion of the slide is loosely received and by means of which such slide is maintained in position between its said guides.

In the preferred form of the construction, as here shown the said frame, including the guides and pocket, will be composed of two pieces of sheet metal arranged face-to-face.

The front piece, as shown in Fig. 6, will include two guide portions and the front enclosing shield 10, such plate being bent or turned over along the dotted lines to place the said shield portion outward the required distance to accommodate the slide and also to outwardly flange the guide portions at their slide-receiving edges thereby reinforcing such guide portions and providing them with suitable surfaces for contact with the lateral edges of the slide.

The rear piece shown in Fig. 5, includes guide portions, adapted to lie against the rear face of the corresponding portions of the front plate, and the rear shield portion 11. This rear plate is formed also at its lower end with an extension adapted to be bent along the dotted lines so as to extend beneath the shield 10, this constituting the portion 7, and a portion 12 adapted to lie against the outer face of the shield 10 and to which it is secured as by means of a rivet 13.

If so desired however, the downward extension providing the portion 7 may be provided upon the front plate instead of upon the rear plate as here shown.

The two said plates will also be secured together at their lateral or guide portions as by means of rivets 14 and suitable through holes as 15 will also be provided to receive the screws 4.

It will be understood therefore that in this manner the said frame of the device may be simply and easily constructed by stamping or pressing from sheet metal.

I claim:

1. The combination with a piano case having a pedal opening and a pedal mounted for vertical movement therein, of a pair of guide members secured one at each side of said pedal opening, a slidable member disposed beneath said pedal and slidable vertically between said guide members, a plate connecting the lower portions of said guide members and forming a pocket enclosing the lower portion of said slidable member, and helical springs housed within said pocket and interposed in compression between the lower end of the slide and the bottom of the pocket thereby to maintain the slide in contact with the pedal.

2. The combination with a piano case having a pedal opening and a pedal mounted for vertical movement therein, of a mouse-excluding device comprising a pair of sheet metal plates bent upon themselves and cooperating together to form a pocket and a pair of guide members one at each side of said pocket, said guide members having lateral flanges for the reception of means for securing them at opposite sides of said pedal opening, a slide member disposed in said pocket below said pedal and slidable vertically between said guide members, and helical springs in compression between the lower end of the slide and the bottom of the pocket thereby to maintain the slide in contact with said pedal.

In testimony whereof I have signed my name to this specification.

PERCY GEORGE BERRY.